US008604630B2

(12) United States Patent
Folken

(10) Patent No.: US 8,604,630 B2
(45) Date of Patent: Dec. 10, 2013

(54) POWER DISTRIBUTION SYSTEM HAVING PRIORITY LOAD CONTROL

(75) Inventor: Keith Ronald Folken, West Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 473 days.

(21) Appl. No.: 13/032,212

(22) Filed: Feb. 22, 2011

(65) Prior Publication Data

US 2011/0291411 A1    Dec. 1, 2011

Related U.S. Application Data

(60) Provisional application No. 61/350,324, filed on Jun. 1, 2010.

(51) Int. Cl.
*H02H 3/00* (2006.01)
*G01R 35/00* (2006.01)

(52) U.S. Cl.
USPC .................................... 290/7; 322/18; 361/72

(58) Field of Classification Search
USPC .......... 290/7; 322/18, 37; 702/60; 361/72, 73
See application file for complete search history.

(56) References Cited

U.S. PATENT DOCUMENTS

| 4,321,645 A | 3/1982 | Thom et al. | |
|---|---|---|---|
| 5,498,956 A * | 3/1996 | Kinney et al. | 324/142 |
| 6,008,971 A | 12/1999 | Duba et al. | |
| 6,369,995 B1 * | 4/2002 | Kagawa et al. | 361/62 |
| 6,798,627 B2 | 9/2004 | Schultz et al. | |
| 6,972,936 B2 * | 12/2005 | Morris | 361/42 |
| 6,992,872 B2 * | 1/2006 | Morris et al. | 361/72 |
| 7,566,990 B2 * | 7/2009 | Loucks et al. | 307/64 |
| 7,626,798 B2 | 12/2009 | Rusan et al. | |
| 7,635,967 B2 * | 12/2009 | Loucks et al. | 322/18 |
| 8,478,550 B2 * | 7/2013 | Folken et al. | 702/60 |
| 2007/0135971 A1 | 6/2007 | Andarawis et al. | |
| 2008/0290666 A1 | 11/2008 | Bourgeau et al. | |
| 2009/0290275 A1 | 11/2009 | Staszesky et al. | |
| 2010/0002348 A1 | 1/2010 | Donolo et al. | |
| 2010/0039741 A1 | 2/2010 | Booth et al. | |

* cited by examiner

*Primary Examiner* — Nicholas Ponomarenko
(74) *Attorney, Agent, or Firm* — Finnegan, Henderson, Farabow, Garrett & Dunner LLP

(57) ABSTRACT

A power distribution system is disclosed. The power distribution system may have a generator, a first load interruption device associated with the generator, and a load powered by the generator. The power distribution system may also have a second load interruption device associated with the load, and a generator controller. The generator controller may be configured to control the generator, determine existence of a fault condition associated with electric service between the generator and the load, and selectively activate the second load interruption device based on the determination. The generator controller may be further configured to determine if activation of the second load interruption device isolated the fault condition, and selectively activate the first load interruption device when activation of the second load interruption device fails to isolate the fault condition.

20 Claims, 2 Drawing Sheets

POWER DISTRIBUTION SYSTEM HAVING PRIORITY LOAD CONTROL

RELATED APPLICATIONS

This application is based on and claims the benefit of priority from U.S. Provisional Application No. 61/350,324 by Keith R. FOLKEN, filed Jun. 1, 2010, the contents of which are expressly incorporated herein by reference.

TECHNICAL FIELD

The present disclosure relates generally to a power distribution system, and more particularly, to a power distribution system having priority load control.

BACKGROUND

Mobile power units are self-contained power modules that can be permanently or temporarily connected to an offboard facility, for example to a home, a hospital, or a factory, to provide primary, supplemental, and emergency backup power. Cables extend from a distribution grid of the facility to the mobile power units and are selectively connected to the mobile power units by way of load interruption devices, for example generator breakers. Additional load breakers are commonly associated with different components and/or branches of the facility's distribution grid.

During operation of the mobile power units, fault conditions can occur that should be isolated to minimize damage to the facility and to the mobile power units. These fault conditions can include over-current conditions and over- or under-voltage conditions caused by open-circuits and short-circuits. Whenever an over-current fault condition is detected, all breakers, including the generator breaker and the load breakers, trip to disconnect the mobile power units from the branches and components of the facility, thereby isolating the open- or short-circuits.

Although existing power distribution systems described above may adequately isolate fault conditions in some situations, they can cause inefficiencies, production losses, and increased operating costs. In particular, even if the fault condition is associated with only one component or one distribution branch of a facility, existing distribution systems disconnect power from all components and branches of the facility and maintain the disconnections until the fault condition is corrected. In these situations, critical components and/or branches not directly associated with the fault condition are unnecessarily shut down, thereby reducing efficiency and productivity of the facility. In addition, each breaker must be individually reset, which can require significant time and labor, thereby increasing operating costs of the facility.

One attempt to reduce operational interruptions caused by fault conditions at a facility is described in U.S. Patent Publication No. 2010/0039741 (the '741 publication) of Booth et al. published on Feb. 18, 2010. In particular, the '741 publication discloses an electrical protection arrangement for a distribution network that is provided between a power source and multiple electric loads. The arrangement comprises multiple fault current flow detectors set in a hierarchy of levels, and a controller configured to actively trip a circuit breaker associated with each fault current flow detector. The controller determines, by sequential movement along a fault path, at which level in the hierarchy of levels the circuit breaker should be tripped to isolate parts of the electrical distribution network. Generally, the lowest level within the hierarchy of levels is tripped first to isolate a minimum amount of the electrical distribution network, leaving the remainder of the network operational.

Although perhaps helpful in reducing operational interruptions in some situations, the electrical protection arrangement of the '741 publication may still be problematic. In particular, the arrangement of the '741 publication may require specialized and dedicated detectors and controllers that increase a cost of the arrangement. In addition, the arrangement of the '741 publication may not be applicable and/or provide little benefit to networks that include mobile power units.

The disclosed power distribution system is directed to overcoming one or more of the problems set forth above and/or other problems of the prior art.

SUMMARY

One aspect of the present disclosure is directed to a power distribution system. The power distribution system may include a generator, a first load interruption device associated with the generator, and a load powered by the generator. The power distribution system may also include a second load interruption device associated with the load, and a generator controller. The generator controller may be configured to control the generator, to determine existence of a fault condition associated with electric service between the generator and the load, and to selectively activate the second load interruption device based on the determination. The generator controller may be further configured to determine if activation of the second load interruption device isolated the fault condition, and to selectively activate the first load interruption device when activation of the second load interruption device fails to isolate the fault condition.

In another aspect, the present disclosure is directed to a generator set. The generator set may include an engine and a generator driven by the engine to generate electric power. The generator set may also include a generator interruption device, and a connector configured to electrically connect an output of the generator to an external load via a load interruption device. The generator set may further include a generator controller in communication with the engine, the generator, the generator interruption device, and the load interruption device. The generator controller may be configured to regulate operation of the engine and generator, to determine existence of a fault condition associated with electric service passing through the connector, and to selectively activate the load interruption device based on the determination. The generator controller may also be configured to determine if activation of the load interruption device isolated the fault condition, and to selectively activate the generator interruption device when activation of the load interruption device fails to isolate the fault condition.

In another aspect, the present disclosure is directed to a mobile power unit. The mobile power unit may include a frame, an engine connected to the frame, and a generator connected to the frame and driven by the engine. The mobile power unit may also include an onboard generator interruption device, a connector configured to connect an output of the generator to an offboard facility load, and a controller connected to the frame and in communication with the engine, the generator, the onboard generator interruption device, and an offboard load interruption device associated with the offboard facility load. The controller may be configured to regulate operation of the mobile power unit, to determine existence of a fault condition associated with electric service passing through the connector, and to selectively activate the offboard load interruption device based on the determination.

The controller may also be configured to determine if activation of the offboard load interruption device isolated the fault condition, and to selectively activate the onboard generator interruption device when activation of the offboard load interruption device fails to isolate the fault condition.

DETAILED DESCRIPTION

Figure 1:
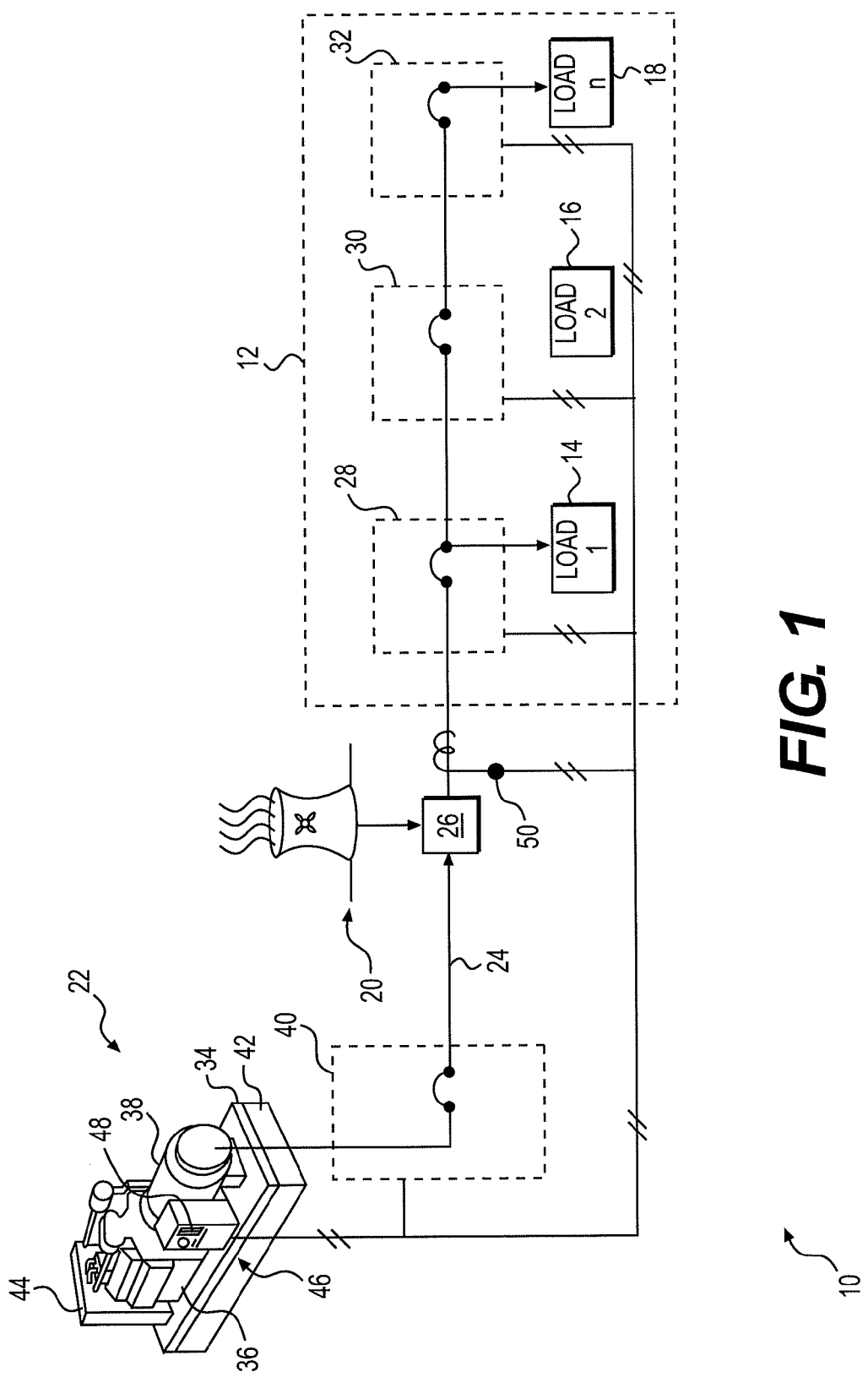
FIG. 1 is a diagrammatic illustration of an exemplary power distribution system.

FIG. 1 illustrates an exemplary power distribution system 10 consistent with certain disclosed embodiments. Power distribution system 10 may be configured to provide power to a facility 12, for example to a home, a hospital, or a factory. In one exemplary embodiment, power distribution system 10 may provide emergency backup power to one or more loads 14, 16, 18 at facility 12 when power supplied from a utility power grid 20 is interrupted. In another embodiment, power distribution system 10 may be configured to provide primary power or temporary supplemental power, if desired. As shown in FIG. 1, power distribution system 10 may include a mobile power unit 22 connected to loads 14-18 by way of a power transmission network 24 and a connector 26.

Loads 14-18 may include any type of power consuming system or device at facility 12 that is located external to and offboard of mobile power unit 22. Loads 14-18 may be arranged in series to receive electric power supplied by utility power grid 20 and mobile power unit 22 and to utilize the electric power to perform specialized tasks. Loads 14-18 may include, for example, lights, motors, heating elements, electronic circuitry, refrigeration devices, air conditioning units, computer servers, industrial machines, etc. In one exemplary embodiment, one or more of loads 14-18 may be more critical than one or more other loads 14-18 at facility 12. For example, a first load 14 may be more critical than a downstream second load 16, which in turn may be more critical than a third load 18 located at a distal end of transmission network 24. In this arrangement, first load 14 may be a load that requires uninterrupted electric service; second load 16 may be a load that benefits from uninterrupted electric service; and third load 18 may be a load that is substantially unaffected by electric service interruptions. Exemplary loads 14 that require or benefit from uninterrupted power may include those found in life-support systems, traffic controllers, computer servers, telecommunication installations, and industrial applications.

A load interruption device may be associated with each of loads 14-18. For example, a first load interruption device 28 may be associated with first load 14; a second load interruption device 30 may be associated with second load 16; and a third load interruption device 32 may be associated with third load 18. Each of load interruption devices 28-32 may embody facility interruption devices that are located external to and offboard of mobile power unit 22, and be configured to selectively disconnect their associated loads 14-18 from transmission network 24 when activated. In one example, each of load interruption devices 28-32 may embody a mechanical switch or a solid state device such as a breaker that is tripped or opened to disconnect its associated load 14-18 from transmission network 24, and is reset or closed to connects its load 14-18 to transmission network 24. Because of the series arrangement of loads 14-18, tripping of a load interruption device 28-32 located further downstream on transmission network 24 and away from mobile power unit 22 may not substantially affect electric service to loads 14-18 located further upstream on transmission network 24. In contrast, tripping of a load interruption device 28-32 located further upstream on transmission network 24 may disconnect electric service from all of loads 14-18 located further downstream on transmission network 24.

Transmission network 24 may embody any electric transmission system for distributing electric power generated by utility power grid 20 and mobile power unit 22 to loads 14-18. For example, transmission network 24 may include a system of transmission lines, connection equipment (e.g., switch gears, transformers, power relays, and the like), and other suitable devices for distributing electric power across a power grid. In one embodiment, portions of transmission network 24 may be buried underground and/or run overhead via transmission towers.

Connector 26 may include any type of device capable of coupling together one or more of mobile power unit 22, utility power grid 20, transmission network 24, and/or loads 14-18 of facility 12. For example, connector 26 may include various transfer switches, junction boxes, fuses, or any other components that may be suitable for electrically interconnecting one or more systems. Connector 26 may also or alternatively include a voltage transformer configured to reduce or otherwise condition the voltage of power provided by mobile power unit 22 and/or utility power grid 20 to a suitable level for use by conventional consumer devices.

Mobile power unit 22 may embody a frame-mounted generator set (genset) having components that interact to generate electric power. Accordingly, mobile power unit 22 may comprise a frame 34, a prime mover 36 mounted to frame 34, and a generator 38 mounted to frame 34 and mechanically coupled to rotate with an output of prime mover 36. For the purposes of this disclosure, prime mover 36 is depicted and described as a heat engine, for example, a combustion engine that combusts a mixture of fuel and air to produce the rotating mechanical output. One skilled in the art will recognize that prime mover 36 may be any type of combustion engine such as a diesel engine, a gasoline engine, or a gaseous fuel-powered engine. Generator 38 may be, for example, an AC induction generator, a permanent-magnet generator, an AC synchronous generator, or a switched-reluctance generator. In one embodiment, generator 38 may include multiple pairings of poles (not shown), each pairing having three phases arranged on a circumference of a stator (not shown) to produce an alternating current with a frequency of 50 or 60 Hz. Electric power produced by generator 38 may be directed offboard mobile power unit 22 to facility 12 by way of transmission network 24 and connector 26. A generator interruption device 40 may be associated with generator 38 to selectively disconnect generator 38 from transmission network 24. In one example, generator interruption device 40 may embody a mechanical switch or a solid state device such as a breaker that is included within and mounted onboard mobile power unit 22. Generator interruption device 40 may selectively trip or open to disconnect generator 38 from transmission network 24, and reset or close to connect generator 38 to transmission network 24.

Mobile power unit 22 may include additional components that facilitate electric power generation in a mobile configuration. For example, mobile power unit 22 may include an onboard fuel tank 42 and a cooling system 44. Fuel tank 42 may be connected to a lower side of frame 34 and form a portion of a mounting platform for prime mover 36 and generator 38. Alternatively, fuel tank 42 may be mounted between side rails (not shown) of frame 34. Fuel tank 42 may hold a supply of fuel for use by prime mover 36. Cooling system 44 may also be mounted to frame 34 and include components, for example a radiator, a fan, and associated coolant lines, that direct chilled coolant through prime mover 36 and/or generator 38. These components and others may allow mobile power unit 22 to be moved from one facility 12 to another without significant external support and preparations at each facility 12.

Mobile power unit 22 may also include a terminal box 46 mounted to frame 34 and housing a controller 48 that is in communication with prime mover 36, generator 38, and load interruption devices 28-32 and 40. Controller 48 may embody a single or multiple microprocessors, field programmable gate arrays (FPGAs), digital signal processors (DSPs), etc. that include a means for controlling operations of prime mover 36, generator 38, and load interruption devices 28-32 and 40 in response to various input. Numerous commercially available microprocessors can be configured to perform the functions of controller 48. It should be appreciated that controller 48 could readily embody a microprocessor separate from those that control functions of facility 12, and that controller 48 may communicate with facility microprocessors via datalinks or other methods. Various other known circuits may be associated with controller 48, including power supply circuitry, signal-conditioning circuitry, actuator driver circuitry (i.e., circuitry powering solenoids, motors, or piezo actuators), communication circuitry, and other appropriate circuitry.

According to one embodiment, controller 48 may be configured to monitor performance of power distribution system 10 and responsively regulate operations of load interruption devices 28-32 and 40. For example, controller 48 may monitor a current, a frequency, and/or a voltage characteristic of the electric power provided by mobile power unit 22 through connector 26 to offboard loads 14-18. In response to a quality deviation of supplied power (i.e., a fault condition associated with the current, frequency, and/or voltage of power passing through transmission network 24), controller 48 may selectively trip or reset interruption devices 28-32 and 40 to isolate a cause of the quality deviation.

Controller 48 may monitor performance of power distribution system 10 by way of one or more sensors 50, for example current transformers, that are strategically located along portions of transmission network 24. Each sensor 50 may be configured to monitor the current, frequency, and/or voltage of power generated by mobile power unit 22 and directed to offboard loads 14-18, and to generate corresponding signals directed to controller 48.

Figure 2:
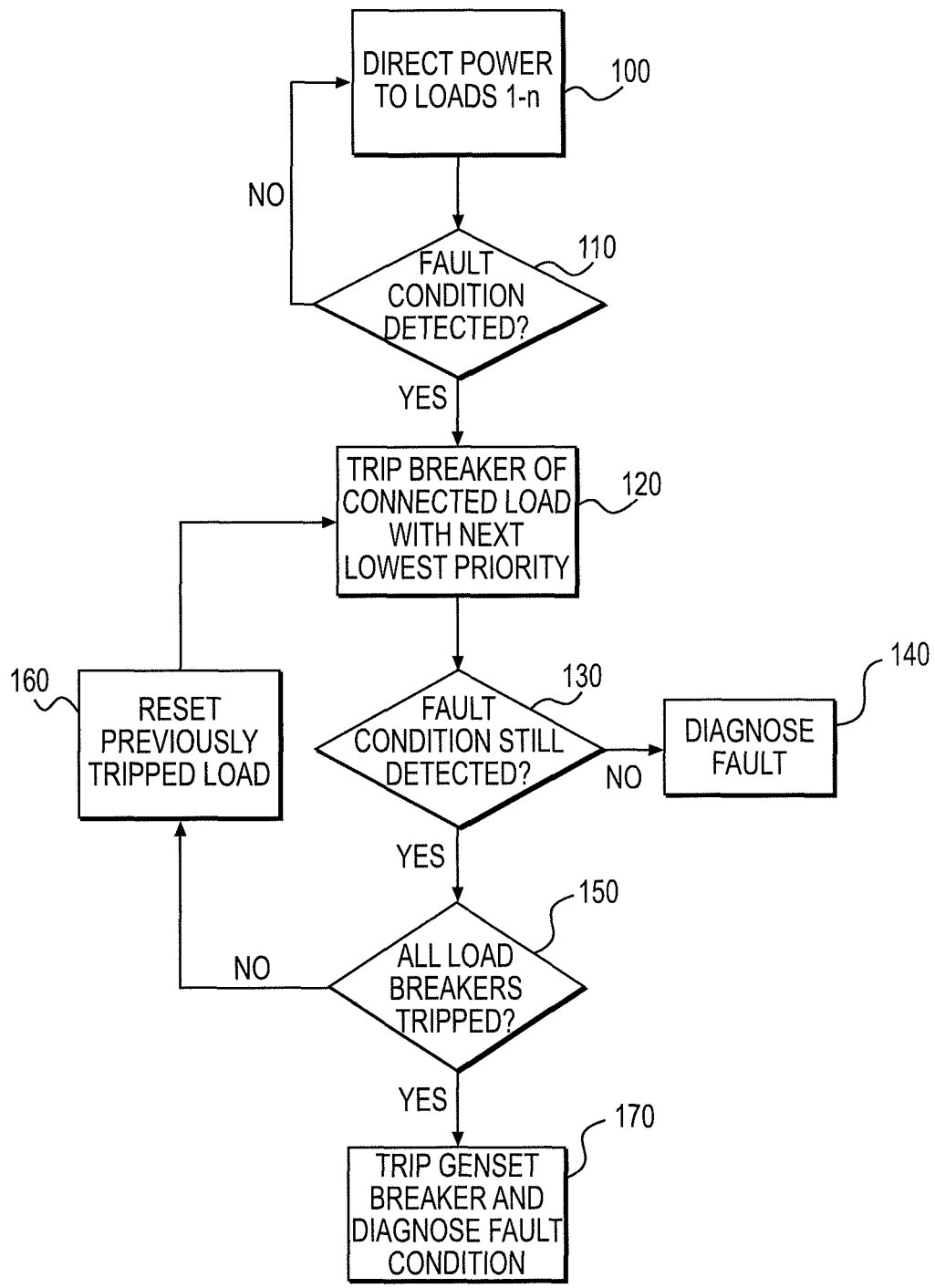
FIG. 2 is a flowchart illustrating an exemplary disclosed method for operating the power distribution system of FIG. 1.

FIG. 2 may illustrate an exemplary operation of power distribution system 10. FIG. 2 will be discussed in more detail in the following section to further illustrate the disclosed concepts.

Industrial Applicability

The disclosed power distribution system may help to direct electric power having consistent quality from a mobile power unit to offboard loads of a facility in an efficient and cost-effective manner. In particular, the disclosed power distribution system may monitor quality characteristics of the electric power produced by the mobile power unit and, in response to deviations from desired power characteristics, selectively isolate a cause of the deviations without shutting down the entire power distribution system. By isolating just the cause of the deviations, without shutting down the entire power distribution system, critical loads of the power distribution system may remain operational and less time and resources may be required to correct the cause of the deviations. FIG. 2 will be now be discussed in detail.

During operation of power distribution system 10, prime mover 36 of mobile power unit 22 may be activated to drive generator 38 and produce electric power. In particular, prime mover 36 may draw and combust fuel from tank 42 to generate a rotational output that drives generator 38 to produce electric power in an amount based on a demand of facility 12. The electric power may be directed through generator interruption device 40 to transmission network 24 and loads 14-18 located offboard of mobile power unit 22 (Step 100). The electric power from mobile power unit 22 may be directed to loads 14-18 whenever utility power 20 is unavailable or insufficient to meet the power demands of facility 12.

Throughout operation of power distribution system 10, controller 48 may continuously monitor quality characteristics of the power (i.e., the current, frequency, and/or voltage) via sensor 50 to determine if a fault condition exists. Controller 48 may determine existence of the fault condition (Step 110) based on a comparison of the monitored quality characteristics to desired characteristics stored in memory. If it is determined that the monitored quality characteristics significantly deviate from the desired characteristics, controller 48 may determine that a fault condition exists. Control of power distribution system 10 may loop between steps 100 and 110 until existence of a fault condition is detected.

When controller 48 determines existence a fault condition (Step 110: Yes) during operation of power distribution system 10 (e.g., when controller 48 detects an over-current condition), controller 48 may selectively trip load interruption devices 28-32 in an attempt to isolate a cause of the fault condition. Specifically, controller 48 may trip a load interruption device 28-32 that has not recently been tripped and that is associated with the offboard load 14-18 that is least critical and has the lowest corresponding priority (Step 120). As described above, offboard load 14 may be most critical, followed by offboard load 16, with offboard load 18 being least critical and having the lowest corresponding priority. Thus, in the example of FIG. 1, if no other of load interruption devices 28-32 has recently been tripped in response to the existing fault condition, load interruption device 32 may be the first-tripped device.

After tripping the load interruption device 28-32 associated with the least critical load 14-18, controller 48 may check to see if the fault condition is still detectable (Step: 130). That is, controller 48 may compare the electric power quality characteristics monitored by sensor 50 to the desired characteristics and determine if significant deviations still exist. If significant deviations no longer exist (Step 130: No), it can be concluded that the most recent tripping isolated the cause of the fault condition, and diagnosis of the fault condition can be initiated (Step 140) while the remainder of power distribution system 10 remains operational. Because the most recent tripping isolated the fault condition, diagnosis can be limited to just the corresponding offboard load and associated portions of transmission network 24.

If at step 130, however, the fault condition is still detectable (Step 130: Yes), it can be concluded that the most recent tripping failed to isolate the fault condition and that the fault condition is associated with a different portion of power distribution system 10 (i.e., a portion further upstream from the recently-tripped load interruption device 28-32). At this point in time, controller 48 may determine if any load interruption device 28-32 has not yet been tripped (Step 150). If one or more of load interruption devices 28-32 have not yet been tripped, the most recently-tripped of load interruption devices 28-32 may be reset (Step 160) and control may return to step 120, where the load interruption devices 28-32 not yet tripped and associated with the most critical offboard load 14-18 may be tripped. Control may continue to loop through steps 120-160 until all load interruption devices 28-32 have been tripped.

In situations where all load interruption devices 28-32 have been tripped and the fault condition persists, controller 48 may trip generator load interruption device 40 (Step 170). In one example, controller 48 may delay a time period after tripping all of load interruption devices 28-32 and before tripping generator load interruption device 40, if desired. By tripping generator load interruption device 40 after all of load interruption devices 28-32 have already been tripped during previous attempts to isolate the cause of the fault condition, opportunities may be provided for continued use of critical loads not directly associated with or affected by existence of the fault condition.

It will be apparent to those skilled in the art that various modifications and variations can be made to the disclosed power distribution system. Other embodiments will be apparent to those skilled in the art from consideration of the specification and practice of the power distribution system disclosed herein. It is intended that the specification and examples be considered as exemplary only, with a true scope of the disclosure being indicated by the following claims and their equivalents.

What is claimed is:

1. A power distribution system, comprising:
   a generator;
   a first load interruption device associated with the generator;
   a load powered by the generator;
   a second load interruption device associated with the load; and
   a generator controller configured to:
      control the generator;
      determine existence of a fault condition associated with electric service between the generator and the load;
      selectively activate the second load interruption device based on the determination;
      determine if activation of the second load interruption device isolated the fault condition; and
      selectively activate the first load interruption device when activation of the second load interruption device fails to isolate the fault condition.

2. The power distribution system of claim 1, wherein the load is a first load and the power distribution system further includes:
   a second load connected in series with the first load to receive power from the generator; and
   a third load interruption device associated with the second load,
   wherein the generator controller is further configured to:
      selectively activate the third load interruption device based on the fault condition;
      determine if activation of the third load interruption device isolated the fault condition; and
      selectively activate the second load interruption device based on the fault condition only when activation of the third load interruption device fails to isolate the fault condition.

3. The power distribution system of claim 2, wherein the second load is more critical then the first load and continues to receive power when the third load interruption device is activated.

4. The power distribution system of claim 1, further including at least one sensor configured to detect a characteristic of power provided by the generator to the load, wherein the generator controller is configured to determine existence of the fault condition based on input from the at least one sensor.

5. The power distribution system of claim 1, further including a source of utility power connected to the load.

6. The power distribution system of claim 1, wherein the generator controller is further configured to delay a time period after activation of the second load interruption device before activation of the first load interruption device.

7. A generator set, comprising:
   an engine;
   a generator driven by the engine to generate electric power;
   a generator interruption device;
   a connector configured to electrically connect an output of the generator to an external load via a load interruption device; and
   a generator controller in communication with the engine, the generator, the generator interruption device, and the load interruption device, the generator controller being configured to:
      regulate operation of the engine and generator;
      determine existence of a fault condition associated with electric service passing through the connector;
      selectively activate the load interruption device based on the determination;
      determine if activation of the load interruption device isolated the fault condition; and
      selectively activate the generator interruption device when activation of the load interruption device fails to isolate the fault condition.

8. The generator set of claim 7, wherein:
   the external load is a first external load;
   the load interruption device is a first load interruption device; and
   the connector is further configured to electrically connect the output of the generator to a second external load via a second load interruption device.

9. The generator set of claim 8, wherein:
   the connector is configured to connect the output of the generator to the second external load in series with the first external load; and
   the generator controller is further configured to:
      selectively activate the second load interruption device based on existence of the fault condition;
      determine if activation of the second load interruption device isolated the fault condition; and
      selectively activate the first load interruption device based on existence of the fault condition only when activation of the second load interruption device fails to isolate the fault condition.

10. The generator set of claim 9, wherein the first external load is more critical then the second external load and continues to receive power when the second load interruption device is activated.

11. The generator set of claim 7, further including at least one sensor configured to detect a characteristic of power provided by the generator to the external load, wherein the generator controller is configured to determine existence of the fault condition based on input from the at least one sensor.

12. The generator set of claim 7, wherein the generator controller is further configured to delay a time period after activation of the load interruption device before activation of the generator interruption device.

13. A mobile power unit, comprising:
   a frame;
   an engine connected to the frame;
   a generator connected to the frame and driven by the engine;

an onboard generator interruption device;

a connector configured to connect an output of the generator to an offboard facility load; and a controller connected to the frame and in communication with the engine, the generator, the onboard generator interruption device, and an offboard load interruption device associated with the offboard facility load, the controller being configured to:

regulate operation of the mobile power unit;

determine existence of a fault condition associated with electric service passing through the connector;

selectively activate the offboard load interruption device based on the determination;

determine if activation of the offboard load interruption device isolated the fault condition; and selectively activate the onboard generator interruption device when activation of the offboard load interruption device fails to isolate the fault condition.

14. The mobile power unit of claim 13, wherein:

the offboard facility load is a first offboard facility load;

the offboard load interruption device is a first offboard load interruption device; and the connector is further configured to electrically connect the output of the generator to a second offboard facility load via a second offboard load interruption device.

15. The mobile power unit of claim 14, wherein:

the connector is configured to connect the output of the generator to the second offboard facility load in series with the first offboard facility load; and the controller is further configured to:

selectively activate the second offboard load interruption device based on existence of the fault condition;

determine if activation of the second offboard load interruption device isolated the fault condition; and selectively activate the first offboard load interruption device based on existence of the fault condition only when activation of the second offboard load interruption device fails to isolate the fault condition.

16. The mobile power unit of claim 15, wherein the first offboard facility load is more critical then the second offboard facility load and continues to receive power when the second offboard load interruption device is activated.

17. The mobile power unit of claim 13, further including at least one sensor configured to detect a characteristic of power provided by the generator to the offboard facility load, wherein the controller is configured to determine existence of the fault condition based on input from the at least one sensor.

18. The mobile power unit of claim 13, wherein the controller is further configured to delay a time period after activation of the offboard facility load interruption device before activation of the onboard generator interruption device.

19. The mobile power unit of claim 13, further including a cooling system mounted to the frame and configured to cool at least one of the engine and the generator.

20. The mobile power unit of claim 13, further including a fuel tank mounted to the frame and configured to supply fuel to the engine.

* * * * *